United States Patent [19]

Chaverot et al.

[11] Patent Number: 5,314,935
[45] Date of Patent: May 24, 1994

[54] BITUMEN/POLYMER COMPONENT MAKING IT POSSIBLE TO OBTAIN BITUMEN/POLYMER COMPOSITIONS WITH VERY LOW THERMAL SENSITIVITY, CAPABLE OF BEING EMPLOYED FOR THE PRODUCTION OF SURFACINGS

[75] Inventors: Pierre Chaverot, Oullins; Claude Lacour, Vienne, both of France

[73] Assignee: Elf Antar France, Courbevoie, France

[21] Appl. No.: 920,572

[22] PCT Filed: Dec. 17, 1991

[86] PCT No.: PCT/FR91/01018
§ 371 Date: Oct. 6, 1992
§ 102(e) Date: Oct. 6, 1992

[87] PCT Pub. No.: WO92/11321
PCT Pub. Date: Jul. 9, 1992

[30] Foreign Application Priority Data

Dec. 18, 1990 [FR] France .................. 90 15788
Dec. 18, 1990 [FR] France .................. 90 15789

[51] Int. Cl.$^5$ ............................................ C08L 95/00
[52] U.S. Cl. ............................ 524/64; 524/68; 524/69; 524/70; 524/71

[58] Field of Search .................. 524/64, 68, 69, 70, 524/71

[56] References Cited

U.S. PATENT DOCUMENTS

| | | | |
|---|---|---|---|
| 3,803,066 | 4/1974 | Petrossi | 524/71 |
| 3,992,340 | 11/1976 | Bonitz | 524/70 |
| 4,554,313 | 11/1985 | Hagenbach et al. | 524/68 |
| 4,567,222 | 1/1986 | Hagenbach et al. | 524/476 |
| 5,104,916 | 4/1992 | Trinh et al. | 524/71 |

FOREIGN PATENT DOCUMENTS 9002776 3/1990 World Int. Prop. O. ........... 524/68

Primary Examiner—Paul R. Michl
Assistant Examiner—Peter Szekely
Attorney, Agent, or Firm—Burgess, Ryan & Wayne

[57] ABSTRACT

A bitumen/polymer component of the type consisting of a hydrocarbon matrix is provided in which a sulphur-crosslinked elastomer is distributed homogeneously in a quantity such that it presents 5% to 20% by weight of the bitumen/polymer component. The component exhibits a penetration, determined according to NF standard T 66004, and a ball-and-ring softening temperature, determined according to NF standard T 66008, such that the Pfeiffer number, which links these quantities, assumes values greater than 5 in the case of the bitumen/polymer component.

41 Claims, No Drawings

BITUMEN/POLYMER COMPONENT MAKING IT POSSIBLE TO OBTAIN BITUMEN/POLYMER COMPOSITIONS WITH VERY LOW THERMAL SENSITIVITY, CAPABLE OF BEING EMPLOYED FOR THE PRODUCTION OF SURFACINGS

BACKGROUND OF THE INVENTION

1) Field of the Invention

The invention relates to a bitumen/polymer component capable of being employed for forming bitumen/polymer compositions with very low thermal sensitivity. It also relates to the bitumen/polymer compositions formed and to the use of the said component and composition for the production of surfacings and especially of road surfacings.

2) Background Art

One of the main causes of destruction of roadways made with the use of bituminous mixes prepared by employing bituminous binders is the loss of transverse smoothness as a result of the formation of ruts due to an irreversible creep of the bituminous binder forming part of the bituminous mix. In this process the characteristics of the bituminous binder become inadequate to maintain the cohesion of the structure and this results in a reduction, or even annulation of the void content of the bituminous mix layer. Under these conditions the bitumen acts as a lubricant rather than as a cohesion promoter. To overcome this disadvantage, which additionally presents obvious hazards where the safety of the road users is concerned, it has been proposed to increase the hardness of the bituminous binders employed, that is to say to make use of low-penetration bitumens as bituminous binders.

Another problem arises when large cracks appear in roadways during the first frosty days and above all when this frost reaches the deep courses of the roadway. Since the cooling of the surface structures of the roadway takes place more quickly than the cooling of the structures situated at greater depth, very large thermal shrinkage stresses are generated. Since the ability of a bitumen to withstand such stresses is directly related to its ability to relax these stresses, it is important that the bituminous matrix of a roadway made from bituminous mixes should have a high concentration of oily fractions. This entails the use of soft bitumens of high penetration to form the bituminous binder of the bituminous mix. The problem then lies in the ability of these bitumens to withstand the permanent deformations.

A bituminous binder which is suitable for the production of roadways must therefore have properties which represent the best possible compromise between two tendencies, namely brittle strength when cold, which requires the use of soft bitumens of high penetration to form the bituminous binder, and resistance to permanent deformations, which requires the use of bitumen of low penetration to constitute the bituminous binder.

These properties of a bituminous binder can be quantified by determining the plasticity range, defined as the difference between the ball-and-ring softening temperature (abbreviated to BRT), expressing the properties of the bituminous binder when heated, and the Fraass brittleness point, expressing the properties of the said binder when cold. The resistance of the bituminous binder to hot and cold stresses will be proportionally better the wider the plasticity range.

The penetration, ball-and-ring softening temperature (BRT) and Fraass brittleness point values employed for characterising the bituminous binders are obtained by standardised procedures (identified by French Standards) as shown below:

penetration: determined according, to French Standard NF standard T 66004 and expressed in 1/10 of mm;

ball-and-ring softening temperature: determined according to NF standard T 66008 and expressed in °C.;

Fraass brittleness point: determined according to French Standard IP standard 80/53 and expressed in °C.

The properties of a bituminous binder can also be quantified by determining the thermal sensitivity of the said binder from curves of variation of characteristics of the binder as a function of temperature, the thermal sensitivity being directly related to the slope of the said variation curves.

An indication of the thermal sensitivity of a bituminous binder can also be obtained from a correlation between the penetration (abbreviated to pen) and the BRT of the binder, known as the Pfeiffer number (abbreviated to PF).

This number is calculated from the relationship $$PF = \frac{20 - 500 A}{1 + 50 A}$$

in which A is the slope of the straight line represented by the equation $$A = \frac{\log_{10} 800 - \log_{10} \text{pen}}{BRT - 25}$$

The thermal sensitivity of the bituminous binder is proportionally lower the higher the value of the Pfeiffer number or—which amounts to the same thing—the lower the value of the quantity A.

In the case of conventional bitumens the Pfeiffer number assumes values which lie in the region of zero. Oxidised bitumens exhibit much higher Pfeiffer number values, of between 3 and 7, but their penetration is lower than 50 and can reach values as low as zero in some extreme cases, which means that these products will have an increased resistance to permanent deformations but will exhibit a very high brittleness when cold.

Bituminous binders of the bitumen/polymer type, especially of the bitumen/elastomer type or of the bitumen/plastomer type have Pfeiffer number values greater than zero and capable of reaching two, and this represents an important step forward towards the improvement of the performance of roadways subjected to increasingly severe stresses. However, this improvement still remains inadequate in the case of certain areas which are subjected to particularly severe stresses by very heavy traffic and in regions where the differences between summer and winter temperatures are very wide.

SUMMARY OF THE INVENTION

The subject of the invention is a bitumen/polymer component which can be employed for forming bitumen/polymer compositions which exhibit Pfeiffer numbers greater than 5 and more particularly of at least .7, which corresponds to a very low thermal sensitivity, this being at very high penetration levels. The combination of these two factors results in bituminous binders of the bitumen/polymer type which can be employed in the case of the situations described above. In addition, the bitumen/polymer compositions obtained also exhibit excellent elasticity characteristics.

The bitumen/polymer component according to the invention is of the type consisting of a hydrocarbon matrix in which a sulphur-crosslinked elastomer is distributed homogeneously in a quantity such that it represents 5% to 20% by weight of the component, and is characterised in that it exhibits a penetration, determined according to NF standard T 66004, and a ball-and-ring softening temperature, determined according to NF standard T 66008, such that the Pfeiffer number, which links these quantities, assumes, in the case of the said component, values greater than 5 and preferably of at least 7.

The bitumen/polymer component according to the invention advantageously exhibits a penetration of between 80 and 500.

DESCRIPTION OF THE PREFERRED EMBODIMENTS

The bitumen/polymer component according to the invention can be obtained by bringing, between 100° C. and 230° C., preferably between 120° C. and 190° C., and with stirring, a hydrocarbon fraction which has a kinematic viscosity at 100° C. of between $0.5 \times 10^{-4}$ m$^2$/s and $3 \times 10^{-4}$ m$^2$/s, more particularly ranging from $1 \times 10^{-4}$ m$^2$/s to $2 \times 10^{-4}$ m$^2$/s, into contact with 5 to 25%, by weight of the hydrocarbon fraction, of a sulphur-crosslinkable elastomer in the presence of a sulphur-donating coupling agent capable of supplying 0.5 to 10%, more particularly 1 to 8%, by weight of sulphur relative to the elastomer.

The bitumen/polymer component according to the invention, whose main characteristic is that it exhibits a Pfeiffer number greater than 5 and more particularly of at least 7 and one of whose advantageous characteristics is that it has a penetration of between 80 and 500, can be employed for forming bitumen/polymer compositions exhibiting a very low thermal sensitivity and capable of being applied, directly or after conversion into aqueous emulsion, to the production of surfacings and especially of road surfacings of the surface dressing type, to the production of bituminous mixes which are applied with heating or cold, or to the production of watertight facings.

The said bitumen/polymer compositions can consist solely of the bitumen/polymer component or else can be the result of mixing the said component with variable proportions of a bitumen and especially of a bitumen which has a penetration of between 10 and 100 and more particularly between 20 and 60. Thus, it is possible to use bitumen/polymer compositions made up, by weight, of 20% to 100% of the bitumen/polymer component according to the invention and of 80% to 0% of a bitumen, for example a direct distillation or reduced distillation bitumen or else an oxidised or semioxidised bitumen exhibiting a penetration of between 10 and 100 and more particularly between 20 and 60. The blending of the bitumen/polymer component with the bitumen can be carried out either directly following the obtaining of the said component, when virtually immediate use of the bitumen/polymer composition is required, or else after a more or less protracted period of storage of the bitumen/polymer component, when a delayed use of the bitumen/polymer composition is envisaged.

A bitumen/polymer composition exhibiting a Pfeiffer number greater than 5, which can be obtained from the bitumen/polymer component according to the invention, is of the type which consists of a bituminous matrix in which a sulphur-crosslinked elastomer is distributed homogeneously in a quantity such that it represents 0.5% to 15% by weight of the composition, and which has a penetration, determined according to NF standard T 66004, of between 80 and 400 and preferably ranging from 100 to 400, and a ball-and-ring softening temperature, determined according to NF standard T 66008, higher than 55° C. and preferably between 60° C. and 120° C., and is characterised in that it exhibits a Pfeiffer number greater than 5 and preferably of at least 7.

The Fraass point of the said bitumen/polymer composition, determined according to IP standard 80/53 is advantageously lower than −20° C. and preferably lower than −25° C. and the 900% elongation stress of this composition, determined from tensile tests carried out according to NF standard T 46002 with a speed of 500 Mm/minute, is between 0.25 bar and 3 bars at 20° C. and between 2 bars and 20 bars at 5° C.

The above bitumen/polymer composition can be obtained (i) by forming a bitumen/polymer component according to the invention, by bringing, between 100° C. and 230° C. and with stirring, a hydrocarbon fraction which has a kinematic viscosity at 100° C. of between $0.5 \times 10^{-4}$ m$^2$/s and $3 \times 10^{-4}$ m$^2$/s, more particularly ranging from $1 \times 10^{-4}$ m$^2$/s to $2 \times 10^{-4}$ m$^2$/s, into contact with 5 to 25%, by weight of the hydrocarbon fraction, of a sulphur-crosslinkable elastomer, in the presence of a sulphur-donor coupling agent employed in a quantity such that it supplies 0.5 to 10%, more particularly 1 to 8%, by weight of sulphur relative to the elastomer and (ii) by mixing the reaction product obtained, which constitutes the bitumen/polymer component, with an appropriate quantity of a bitumen which has a penetration of between 10 and 100, more particularly between 20 and 60, the operation being carried out between 100° C. and 230° C. and with stirring, to produce a mass constituting the bitumen/polymer composition in which the crosslinked elastomer content is between 0.5 and 15% by weight and lower than the corresponding crosslinked elastomer content of the bitumen/polymer component.

The preparation of the bitumen/polymer component and the production of the bitumen/polymer composition by blending of the bitumen/polymer component and of the bitumen which has a penetration of between 10 and 100 are advantageously carried out at identical or different temperatures between 120° C. and 190° C.

The quantity of bitumen which has a penetration of between 10 and 100, which is blended with the bitumen/polymer component to form the bitumen/polymer composition is preferably such that the said composition contains 0.5% to 7% by weight of sulphur-crosslinked elastomer.

The sulphur-crosslinkable elastomer which is employed to prepare the bitumen/polymer component and which is also found crosslinked with sulphur in the said component, can be such as polyisoprene, polynorbornene, polybutadiene, butyl rubber or ethylene/propene/ diene (EPDM) terpolymer. The said elastomer is advantageously chosen from random or block copolymers of styrene and of a conjugated diene such as butadiene, isoprene, chloroprene, carboxylated butadiene, carboxylated isoprene, and more particularly consists of one or more copolymers chosen from block copolymers of styrene and butadiene, of styrene and isoprene, of styrene and chloroprene, of styrene and carboxylated butadiene or of styrene and carboxylated isoprene. The copolymer of styrene and conjugated diene, and in particular each of the abovementioned copolymers, advantageously has a styrene content ranging from 5% to 50% by weight. The average viscometric molecular mass of the copolymer of styrene and conjugated diene, and especially that of the abovementioned copolymers, may be, for example, between 10,000 and 600,000 and preferably lies between 30,000 and 400,000.

The copolymer of styrene and conjugated diene is preferably chosen from di- or tribloc copolymers of styrene and butadiene, of styrene and isoprene, of styrene and carboxylated butadiene or of styrene and carboxylated isoprene, which have styrene contents and viscometric molecular masses situated within the ranges defined above.

The hydrocarbon fraction employed in the preparation of the bitumen/polymer component can be chosen from various hydrocarbon fractions, especially petroleum cuts or blends of bitumens and of vacuum distillates, which have kinematic viscosities situated within the ranges defined above.

The bitumen/polymer component may be advantageously formed by first of all blending the chosen quantity of sulphur-crosslinkable elastomer with the hydrocarbon fraction, the operation being carried out with stirring at a temperature of between 100° C. and 230° C. and more particularly between 120° C. and 190° C., for a sufficient period, generally of the order of a few tens of minutes to a few hours, and for example of the order of 1 hour to 5 hours, to obtain a homogeneous blend, and by then incorporating into the said blend the sulphur-donor coupling agent in a quantity such that it supplies 0.5% to 10%, more particularly 1% to 8%, by weight of elemental and/or radical sulphur in relation to the elastomer employed and by keeping the whole stirred at a temperature of between 100° C. and 230° C., more particularly between 120° C. and 190° C. and identical or otherwise to the temperature of blending of the elastomer with the hydrocarbon fraction, for a sufficient period, for example a few tens of minutes to a few hours and especially between 30 minutes and 5 hours, to form a reaction product constituting the bitumen/polymer component.

The sulphur-donor coupling agent which is employed in the preparation of the bitumen/polymer component may consist of a product chosen from the group made up of elemental sulphur, hydrocarbyl polysulphides, sulphur-donor vulcanisation accelerators, mixtures of such products with each other and/or with non-sulphur-donor vulcanisation accelerators. In particular, the sulphur-donor coupling agent is chosen from the products M which contain from 0% to 100% by weight of a component A consisting of one or more sulphur-donor vulcanisation accelerators and from 100% to 0% of a component B consisting of one or more vulcanising agents chosen from elemental sulphur and hydrocarbyl polysulphides, and the products N which contain a component C consisting of one or more non-sulphur-donor vulcanisation accelerators and a product M in a weight ratio of the component C to the product M ranging from 0.01 to 1 and preferably from 0.05 to 0.5.

The elemental sulphur capable of being employed to constitute, partially or wholly, the sulphur-donor coupling agent is advantageously flowers of sulphur and preferably sulphur crystallised in the orthorhombic form, known by the name of alpha sulphur.

The hydrocarbyl polysulphides capable of being employed to form at least a proportion of the sulphur-donor coupling agent correspond to the general formula

$$R_7-(S)_v+R_9-(S)_v\}_wR_8$$

in which each of $R_7$ and $R_8$ denotes a saturated or unsaturated, monovalent $C_1-C_{20}$ hydrocarbon radical or they are joined together to form a saturated or unsaturated, divalent $C_2-C_{20}$ hydrocarbon radical forming a ring with the other groups of atoms which are associated in the formula, $R_g$ is a saturated or unsaturated, divalent $C_1-C_{20}$ hydrocarbon radical, the —$(S)_v$— groups denote divalent groups, each made up of v sulphur atoms, it being possible for the vs to differ from one of the said groups to another and to denote integers ranging from 1 to 6 with at least one of the vs equal to or greater than 2, and w denotes an integer assuming values from zero to 10.

In the abovementioned formula the monovalent $C_1-C_{20}$ hydrocarbon radicals $R_7$ and $R_8$ and the divalent $C_1-C_{20}$ hydrocarbon radical $R_g$ are chosen especially from aliphatic, alicyclic or aromatic radicals. When the radicals $R_7$ and $R_8$ are joined together to constitute a divalent $C_1-C_{20}$ hydrocarbon radical forming a ring with the other groups of atoms associated in the formula, the said divalent radical is similar to the radical $R_g$ and may also be of the aliphatic, alicyclic or aromatic type. In particular, the radicals $R_7$ and $R_8$ are identical and chosen from $C_1-C_{20}$ alkyl radicals, for example ethyl, propyl, hexyl, octyl, nonyl, decyl, linear dodecyl, tert-dodecyl, hexadecyl, octadecyl and $C_6-C_{20}$ cycloalkyl and aryl radicals, especially benzyl, phenyl, tolyl, cyclohexyl, whereas the radical $R_g$ or the divalent radical formed by the union of $R_7$ and $R_8$ is chosen from $C_1-C_{20}$ alkylene radicals or $C_6-C_{20}$ cycloalkylene or arylene radicals, especially phenylene, tolylene and cyclohexylene.

The polysulphides which can be employed according to the invention are in particular those defined by the formula $R_7-(S)_u-R_8$ in which each of $R_7$ and $R_8$ denotes a saturated or unsaturated, monovalent $C_1-C_{20}$ hydrocarbon radical or they are linked together to form a divalent $C_1-C_{20}$ radical $R_g$, $R_7$, $R_8$ and $R_g$ having the above meanings, —$(S)_u$— denotes a divalent group formed by a chain sequence of u sulphur atoms, u being an integer ranging from 2 to 6.

The preferred polysulphides correspond to the general formula $R_{10}-(S)_t-R_{10}$ in which $R_{10}$ denotes a $C_6-C_{16}$ alkyl radical and —$(S)_t$— denotes a divalent group made up of a chain sequence of t sulphur atoms, t being an integer ranging from 2 to 5. Examples of such polysulphides are especially dihexyl disulphide, dioctyl disulphide, didodecyl disulphide, di-tert-dodecyl disulphide, dihexadecyl disulphide, dihexyl trisulphide, dioctyl trisulphide, dinonyl trisulphide, di-tert-dodecyl trisulphide, dihexadecyl trisulphide, dihexyl tetrasulphide, dioctyl tetrasulphide, dinonyl tetrasulphide, di-tert-dodecyl tetrasulphide, dihexadecyl tetrasulphide, dihexyl pentasulphide, dioctyl pentasulphide, dinonyl pentasulphide, di-tert-dodecyl pentasulphide and dihexadecyl pentasulphide.

Other polysulphides which can be employed in accordance with the invention are, for example, those such as diphenyl trisulphide, dibenzyl trisulphide, diphenyl tetrasulphide, ortho-tolyl tetrasulphide, dibenzyl tetrasulphide, dibenzyl pentasulphide, diallyl pentasulphide and tetramethyltetrathiane.

The sulphur-donor vulcanisation accelerators can be chosen, in particular, from thiuram polysulphides of general formula

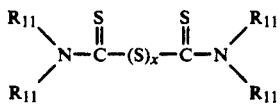

in which each of the $R_{11}$s, which are identical or different, denotes a $C_1$-$C_{12}$ and preferably $C_1$-$C_8$ hydrocarbon radical, especially an alkyl, cycloalkyl or aryl radical, or else two radicals $R_{11}$ attached to the same nitrogen atom are linked together to form a divalent $C_2$-$C_8$ hydrocarbon radical and x is a number ranging from 2 to 8. Examples of such vulcanisation accelerators which may be mentioned are especially the compounds dipentamethylenethiuram disulphide, dipentamethylenethiuram tetrasulphide, dipentamethylenethiuram hexasulphide, tetrabutylthiuram disulphide, tetraethylthiuram disulphide and tetramethylthiuram disulphide.

As other examples of sulphur-donor vulcanisation accelerators there may further be mentioned alkylphenol disulphides and disulphides such as morpholine disulphide and caprolactam N,N'-disulphide.

The non-sulphur-donor vulcanisation accelerators may be sulphur compounds chosen especially from mercaptobenzothiazole and its derivatives, dithiocarbamates of general formula (I)

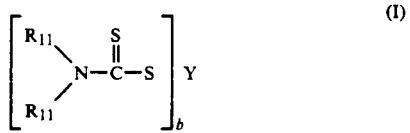

in which the $R_{11}$s, which are identical or different, have the meaning given above, Y denotes a metal and b denotes the valency of Y, and the thiuram monosulphides of general formula (II)

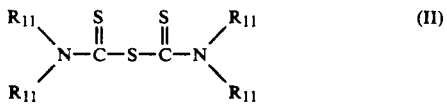

in which the $R_{11}$s, which are identical or different, have the meaning given above.

Examples of vulcanisation accelerators of the mercaptobenzothiazole type may be those such as mercaptobenzothiazole, zinc benzothiazole thiolate, sodium benzothiazole thiolate, benzothiazyl disulphide, copper benzothiazole thiolate, N,N'-diethylthiocarbamyl benzothiazyl sulphide and benzothiazolesulphenamides such as 2-benzothiazolediethylsulphenamide, 2-benzothiazolepentamethylenesulphenamide, 2-benzothiazolecyclohexylsulphenamide, N-oxydiethylene-2-benzothiazolesulphenamide, N-oxydiethylene-2-benzothiazolethiosulphenamide, 2-benzothiazoledicyclohexylsulphenamide, 2-benzothiazolediisopropyl sulphenamide, 2-benzothiazole-tert-butylsulphenamide and N-oxydiethylenethiocarbamyl N'-oxydiethylenesulphenamide.

Among the vulcanisation accelerators of the dithiocarbamate type of general formula (I) there may be mentioned in particular the compounds bismuth dimethyldithiocarbamate, cadmium diamyldithiocarbamate, cadmium diethyldithiocarbamate, copper dimethyldithiocarbamate, zinc dibutyldithiocarbamate, lead diamyldithiocarbamate, lead dimethyldithiocarbamate, lead pentamethylenedithiocarbamate, selenium dimethyldithiocarbamate, tellurium diethyldithiocarbamate, zinc diamyldithiocarbamate, zinc dibenzyldithiocarbamate, zinc diethyldithiocarbamate, zinc dimethyldithiocarbamate and zinc pentamethylenedithiocarbamate.

By way of examples of thiuram monosulphides corresponding to formula (II) there may be mentioned compounds such as dipentamethylenethiuram monosulphide, tetrabutylthiuram monosulphide, tetraethylthiuram monosulphide and tetramethylthiuram monosulphide.

Other non-sulphur-donor vulcanisation accelerators which do not belong to the classes defined above may also be employed. Such vulcanisation accelerators may be those such as 1,3-diphenylguanidine, di-ortho-tolylguanidine and zinc oxide, it being possible for the latter compound to be employed optionally in the presence of fatty acids of the stearic acid, ethylcaproic acid or lauric acid type.

The sulphur-donor vulcanisation accelerators which can be employed according to the invention are advantageously those such as tetramethylthiuram disulphide, tetraethylthiuram disulphide and dipentamethylenethiuram tetrasulphide and the non-sulphur-donor vulcanisation accelerators are those such as 2-mercaptobenzothiazole, dibenzothiazyl disulphide, zinc benzothiazolethiolate, 2-benzothiazolecyclohexylsulphenamide, N-oxydiethylene-2-benzothiazolesulphenamide, 2-benzothiazolediisopropyl sulphenamide, 2-benzothiazoledicyclohexyl sulphenamide, zinc dimethyldithiocarbamate, zinc diethyldithiocarbamate, zinc dibutyldithiocarbamate, tetramethylthiuram monosulphide, di-ortho-tolylguanidine, morpholine disulphide and zinc oxide, Depending on its composition, as indicated above, the sulphur-donor coupling agent may be of the single-component type or of the multicomponent type, it being possible for the coupling agent of the multicomponent type to be made up before it is employed or produced in situ in the mixture in which it is to be present. The sulphur-donor coupling agent of the preformed multicomponent type or of the single-component type or the components of the sulphur-donor coupling agent of the multicomponent type formed in situ may be used as they are, for example in the molten state, or else as a mixture, for example in solution or in suspension, with a diluent, which may be especially a hydrocarbon compound and in particular a proportion of the hydrocarbon fraction employed for preparing the bitumen/polymer component, the said diluent advantageously representing 5 to 45% of the weight of the combination made up of the coupling agent and the diluent.

The bitumen/polymer component may also contain various additives and especially nitrogen compounds of the amine or amide type as promoters of adhesion of the final bitumen/polymer binder to the mineral surfaces, the said nitrogen compounds being preferably grafted onto the bitumen/polymer component.

The invention is illustrated by the following examples, given without any limitation being implied.

In these examples the quantities and percentages are expressed on a weight basis unless shown otherwise.

EXAMPLE 1

In an operation at 170° C. and with stirring, 907.3 parts of a hydrocarbon fraction consisting of a petroleum cut which has a kinematic viscosity of $1.1 \times 10^{-4}$ m²/s at 100° C. were mixed with 90 parts of a diblock copolymer of styrene and butadiene which has a mean viscometric molecular mass of approximately 90,000 and contains 23% of styrene. After 3 hours, blending, 2.7 parts of a sulphur-donor coupling agent consisting of crystallised sulphur were added to the homogeneous mass thus obtained and the whole was kept stirred at a temperature of 170° C. for another 2 hours.

The reaction product obtained as shown above, which constitutes the bitumen/polymer component, exhibited the following characteristics:

penetration: 300
BRT: 65° C.
Pfeiffer number: +9.6

EXAMPLE 2

In an operation at 170° C. and with stirring, 921.8 parts of a hydrocarbon fraction consisting of a petroleum cut which has a kinematic viscosity of $1.2 \times 10^{-4}$ m²/s at 100° C. were mixed with 75 parts of the copolymer employed in Example 1. After 3 hours, blending, 3.2 parts of a sulphur-donor coupling agent made up of 2.55 parts of crystallised sulphur and 0.65 parts of tetramethylthiuram disulphide were added to the homogeneous mass thus obtained and the whole was kept stirred at a temperature of 170° C. for a further 2 hours.

The reaction product obtained as shown above, which constitutes the bitumen-polymer component, exhibited the following characteristics:

penetration: 265
BRT: 66° C.
Pfeiffer number: +8.9

Two bitumen/polymer compositions were prepared from the above bitumen/polymer component by mixing the said component at 170° C. with stirring for 30 minutes with a direct distillation bitumen which has a penetration in the range 40–50, in a weight ratio of the bitumen/polymer component to the bitumen of 1:1 in the case of one of the bitumen/polymer compositions (composition A) and of 3:1 in the case of the other (composition B).

The bitumen/polymer compositions obtained exhibited the following characteristics:

|  | Composition A | Composition B |
| --- | --- | --- |
| penetration | 210 | 270 |
| BRT | 63° C. | 64° C. |
| Pfeiffer number | +7 | +8.7 |
| Fraass point | −27° C. | −29° C. |
| Stress at 900% elongation (speed 500 mm/minute |  |  |
| at 5° C. | 2.9 bars | 2.7 bars |
| at 20° C. | 0.51 bars | 0.45 bars |

We claim:

1. Bitumen/polymer component comprised of a hydrocarbon matrix in which a sulphur-crosslinked elastomer is distributed homogeneously in a quantity such that it represents 5% to 20% by weight of the bitumen/polymer component, the said component exhibiting a penetration, determined according to NF standard T 66004, and a ball-and-ring softening temperature, determined according to NF standard T 66008, such that the Pfeiffer number, which links these quantities, assumes values greater than 5 for the bitumen/polymer component.

2. Bitumen/polymer component according to claim 1, exhibiting a Pfeiffer number of at least 7.

3. Bitumen/polymer component according to claim 1 wherein its penetration is between 80 and 500.

4. Bitumen/polymer component according to claim 1 wherein the sulphur-cross-linked elastomer is a sulphur-crosslinked copolymer of styrene and of a conjugated diene 5. Bitumen/polymer component according to claim 4, wherein the sulphur-crosslinked copolymer of styrene and of a conjugated diene contains 5 to 50 % of styrene by weight.

6. Bitumen/polymer component according to claim 1 which is obtained by bringing, between 100° C. and 230° C. and with stirring, a hydrocarbon fraction which has a kinematic viscosity at 100° C. of between $0.5 \times 10^{-4}$ m²/s and $3 \times 10^{-4}$ m²/s into contact with 5 to 25%, by weight of the hydrocarbon fraction, of a sulphur-crosslinkable elastomer in the presence of a sulphur-donor coupling agent thereby supplying 0.5 to 10% by weight of elemental sulphur relative to the elastomer.

7. Bitumen/polymer component according to claim 6, wherein the contacting of the hydrocarbon fraction with the sulphur-crosslinkable elastomer in the presence of the sulphur-donor coupling agent is carried out at a temperature of between 120° C. and 190° C.

8. Bitumen/polymer component according to claim 6 wherein the hydrocarbon fraction has a kinematic viscosity at 100° C. ranging from $1 \times 10^{-4}$ m²/s to $2 \times 10^{-4}$ m²/s.

9. Bitumen/polymer component according to claim 6 wherein the sulphur-crosslinkable elastomer is a copolymer of styrene and of a conjugated diene.

10. Bitumen/polymer component according to claim 9, wherein the copolymer of styrene and of a conjugated diene has a viscometric mean molecular mass of between 10,000 and 600,00.

11. Bitumen/polymer component according to claim 9 wherein the copolymer of styrene and of a conjugated diene contains 5% to 50% by weight of styrene.

12. Bitumen/polymer component according to claim 6 wherein the sulphur-donor coupling agent is a product selected from the group consisting of elemental sulphur, hydrocarbyl polysulphides, sulphur-donor vulcanisation accelerators, mixtures of such products with each other, mixtures of such products with each other and with non-sulphur-donor vulcanisation accelerators, and mixtures of such products with non-sulphur-donor vulcanisation accelerators.

13. Bitumen/polymer component according to claim 6 wherein a quantity of sulphur-donor coupling agent is employed such that it supplies 1% to 8% by weight of sulphur relative to the sulphur-crosslinkable elastomer.

14. Bitumen/polymer component according to claim 6 which is made up by first of all blending the sulphur-crosslinkable elastomer with the hydrocarbon fraction by stirring at a temperature between 100° C. and 230° C., for a period of a few tens of minutes to a few hours to obtain a homogeneous blend, and then incorporating the sulphur-donor coupling agent into the said blend in a quantity such that it supplies 0.5% to 10%, by weight of elemental sulphur and/or radical sulphur relative to the elastomer employed maintaining the stirring at a temperature between 100° C. and 230° C., to blend the elastomer with the hydrocarbon fraction, for a period between about 30 minutes to about 5 hours, to form the desired product.

15. Bitumen/polymer component according to claim 1 employed to form bitumen/polymer compositions of low thermal sensitivity, which can be applied, directly or after being converted into aqueous emulsion, to the production of a member selected from the group consisting of road surfacings, bituminous mixes and watertight facings.

16. Bitumen/polymer component according to claim 15 employed for constituting, by itself or as a blend with a bitumen, having a penetration of between 10 and 100 bitumen/polymer compositions which can be applied directly or after being converted into aqueous emulsion, to the production of surfacings, to the production of bituminous mixes applied with heating or cold or to the production of watertight facings.

17. Bitumen/polymer component according to claim 16, which is employed to form a bitumen/polymer composition comprising, by weight, 20% to 100% of the bitumen/polymer component and of 80% to 0% of a bitumen exhibiting a penetration of between 10 and 100.

18. Bitumen/polymer composition with a low thermal sensitivity, comprising bituminous matrix in which a sulphur-crosslinked elastomer is distributed homogeneously in a quantity of 0.5% to 15% by weight of the composition, and which has a penetration, determined according to NF standard T 66004, of between 80 and 400 and a ball-and-ring softening temperature, determined according to NF standard T 66008, higher than 55° C., the said composition being characterised in that it exhibits a Pfeiffer number greater than 5.

19. Composition according to claim 18, wherein it exhibits a Pfeiffer number of at least 7.

20. Composition according to claim 18 wherein it exhibits a penetration ranging from 100 to 400.

21. Composition according to claim 18 which exhibits a ball-and-ring softening temperature of between 60° C. and 120° C.

22. Composition according to claim 18 which has a Fraass point, determined according to IP standard 80/53, lower than $-20°$ C.

23. Composition according to claim 18 which exhibits a stress at 900% elongation, determined from tensile tests carried out according to NF standard T 46002 with a speed of 500 mm/minute, of between 0.25 bar and 3 bars at 20° C .and between 2 bars and 20 bars at 5° C.

24. Composition according to claim 18 wherein the crosslinked elastomer is a sulphur-crosslinked copolymer of styrene and of a conjugated diene.

25. Composition according to 24, wherein the sulphur-crosslinked copolymer of styrene and of a conjugated diene contains 5% to 50% of styrene.

26. Composition according to claim 18 which contains 0.5% to 7% by weight of sulphur-crosslinked elastomer.

27. Composition according to claim 18 which is obtained (i) by forming a bitumen/polymer component by bringing, between 100° C. and 230° C. and with stirring, a hydrocarbon fraction which has a kinematic viscosity at 100° C. of between $0.5 \times 10^{-4}$ m²/s and $3 \times 10^{-4}$ m²/s into contact with 5 to 25%, by weight of the hydrocarbon fraction, of a sulphur-crosslinkable elastomer, in the presence of a sulphur-donor coupling agent employed in a quantity such that it supplies 0.5 to 10% by weight of sulphur relative to the elastomer and (ii) by blending the reaction product obtained, which constitutes the bitumen/polymer component, with a suitable quantity of a bitumen which has a penetration of between 10 and 100, the operation being carried out between 100° C. and 230° C. and with stirring, to produce a mass constituting the bitumen/polymer composition in which the crosslinked elastomer content is between 0.5 and 15% by weight and lower than the corresponding content of crosslinked elastomer of the bitumen/polymer component.

28. Composition according to claim 27, wherein the preparation of the bitumen/polymer component and the production of the bitumen/polymer composition by blending the bitumen/polymer component and bitumen which has a penetration of between 10 and 100 are carried out at identical or different temperatures between 120° C. and 190° C.

29. Composition according to claim 27 wherein the quantity of bitumen which has a penetration of between 10 and 100 which is mixed with the bitumen/polymer component to form the bitumen/polymer composition is such that the said composition contains 0.5% to 7% by weight of sulphur-crosslinked elastomer.

30. Composition according to claim 27 wherein the hydrocarbon fraction employed for the preparation of the bitumen/polymer component has a kinematic viscosity at 100° C. ranging from $1 \times 10^{-4}$ m²/s to $2 \times 10^{-4}$ m²/s.

31. Composition according to claim 27 wherein the bitumen which is blended with the bitumen/polymer component to form the bitumen/polymer composition exhibits a penetration of between 20 and 60.

32. Composition according to claim 27 wherein the sulphur-crosslinkable elastomer employed for the formation of the bitumen/polymer component is a copolymer of styrene and of a conjugated diene.

33. Composition according to claim 32, wherein the copolymer of styrene and of a conjugated diene has a mean viscometric molecular mass of between 10,000 and 600,000.

34. Composition according to claim 32 wherein the copolymer of styrene and of a conjugated diene contains 5% to 50% by weight of styrene.

35. Composition according to claim 27, characterised in that the sulphur-donor coupling agent consists of a product selected from the group consisting of elemental sulphur, hydrocarbyl polysulphides, sulphur-donor vulcanisation accelerators, and mixtures of such products with each other and/or with non-sulphur-donor vulcanisation accelerators.

36. Composition according to one of claim 27 wherein, in the preparation of the bitumen/polymer component, a quantity of sulphur-donor coupling agent is employed such that it supplies 1% to 8% by weight of sulphur relative to the elastomer.

37. Composition according to claim 27 wherein the bitumen/polymer component is made up by first blending the chosen quantity of sulphur-crosslinkable elastomer with the hydrocarbon fraction, the operation being carried out with stirring at a temperature of between 100° C. and 230° C. and for a period of a few tens of minutes to a few hours, to obtain a homogeneous blend, and then incorporating the coupling agent in a suitable proportion into the said blend and keeping the resulting mass stirred at a temperature of between 100° C. and 230° C., the elastomer with the hydrocarbon fraction, for a period of a few tens of minutes to a few hours, to form a reaction product constituting the bitumen/polymer component.

38. Bitumen/polymer composition according to claim 18 employed directly or after being converted into aqueous emulsion, for the production of road surfacings, for the production of bituminous mixes applied with heating or cold or for the production of watertight facings.

39. Composition according to claim 27 employed directly or after being converted into aqueous emulsion, for the production of road surfacings for the production of bituminous mixes applied with heating or cold or for the production of watertight facings.

40. Bitumen/polymer component according to claim 1 wherein the sulphur-cross-linked elastomer is a sulphur-crosslinked copolymer of styrene and of a conjugated diene selected from the group consisting of butadiene, isoprene, chloroprene, carboxylated butadiene and carboxylated isoprene.

41. Bitumen/polymer component according to claim 6 wherein the sulphur-cross-linkable elastomer is a copolymer of styrene and of a conjugated diene selected from the group consisting of isoprene, chloroprene, carboxylated butadiene and carboxylated isoprene.

* * * * *